Feb. 10, 1942. A. E. BRONSON 2,272,634
VALVE INSIDES
Filed May 6, 1939

INVENTOR.
ADELBERT E. BRONSON
BY Kwis Hudson & Kent
ATTORNEYS

Patented Feb. 10, 1942

2,272,634

UNITED STATES PATENT OFFICE 2,272,634

VALVE INSIDES

Adelbert E. Bronson, Shaker Heights, Ohio, assignor to The Dill Manufacturing Company, Cleveland, Ohio, a corporation of Ohio Application May 6, 1939, Serial No. 272,176

8 Claims. (Cl. 277—42)

This invention relates to what is commonly known as a valve insides or core which is adapted to be used in connection with a valve stem such as is customarily used in connection with pneumatic tires or other devices adapted for inflation.

One of the objects of the invention is to provide a valve insides or core which may be readily applied to or removed from a valve stem and which requires no special tool for such application or removal but may be manipulated by the fingers of the person making the application or the removal.

A further object of the invention is to provide a valve insides or core which in addition to its application or removal by the use of the fingers provides a structure which does not require the usual valve cap, but the core itself is provided with a closure member which normally closes the outer opening of the valve insides so as to prevent the entrance of dirt or other foreign material.

A further object of the invention is to provide a valve insides or core with a closure member to which reference has just been made, the outer end of which is so shaped as to readily receive the application of the usual inflating chuck in a manner that will not result in peening of the metal that might hinder the proper movement of the valve pin of the valve insides or core.

A further object is to provide a valve insides or core which has a closure member for the outer end thereof but in which the portion of the core is so formed as to provide an enlarged passage for the air when the pneumatic device, in connection with which the valve insides is used, is connected with an inflating chuck.

Reference should be had to the accompanying drawing in which.

There are two well known forms of valve stems which may be used in connection with inner tubes for pneumatic tires and which may be representative of valve stems that can be used in connection with any type of pneumatic device which requires inflation. These two valve stems are known as the metal valve stem and as the rubber valve stem. The metal valve stem is, as its name indicates, made entirely of metal; it is hollow and is adapted to receive, by screwing into the outer end thereof, a valve core or valve insides of which there are well known examples upon the commercial market. The rubber valve stem, as its name indicates, is made principally of rubber, but is provided with what is known as a metal insert, the rubber and the metal insert being united by vulcanizing or any other suitable expedient. The metal insert used as a part of a rubber valve stem is hollow and is adapted, at its outer end, to receive a valve insides or core of any well known type at present on the commercial market.

Figure 2:
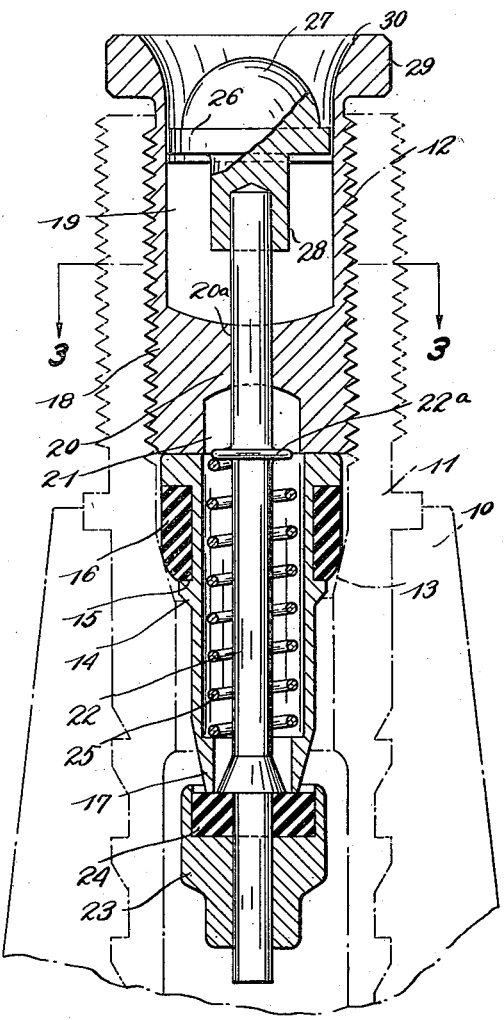
Fig. 2 is a sectional elevation upon the line 2—2 of Fig. 1, with the cooperating valve stem shown in broken lines.
Figure 4:
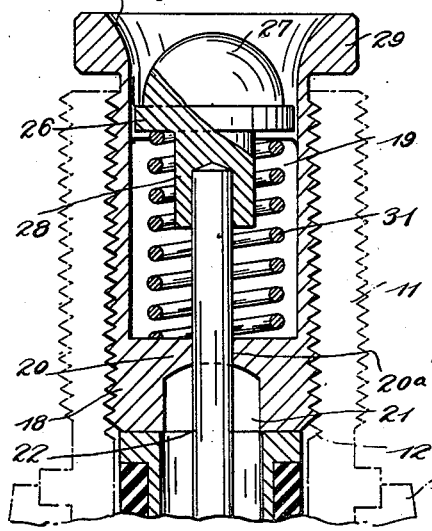
Fig. 4 is a sectional elevation of the outer portion of a modified form of valve insides or core with indication in broken lines of a cooperating valve stem.
Figure 3:
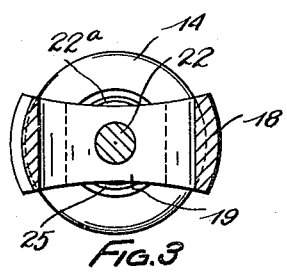
Fig. 3 is a section upon the line 3—3 of Fig. 2.

In Figs. 2 and 4 there is in part shown a rubber valve stem with an insert associated therewith. In the drawing, 10 indicates the rubber stem and 11 indicates a metal insert which is typical of inserts used in connection with rubber stems. The insert 11 is hollow and at the outer end thereof is provided with threads 12 and below the threaded portion there is a shouldered part 13.

The essential features of construction of the all-metal valve stem and of the metal insert for rubber valve stems, to which reference has just been made, are the same in both cases.

The valve insides comprises a hollow body portion 14 which has upon its outer surface a groove 15 which receives a gasket member 16. This gasket member is adapted to cooperate with the shoulder 13 when the valve insides is properly inserted, thereby to provide an air seal.

The lower part of the body portion is somewhat tapered as indicated at 17, for the purpose of providing a valve seat, as will be later described.

Figure 1:
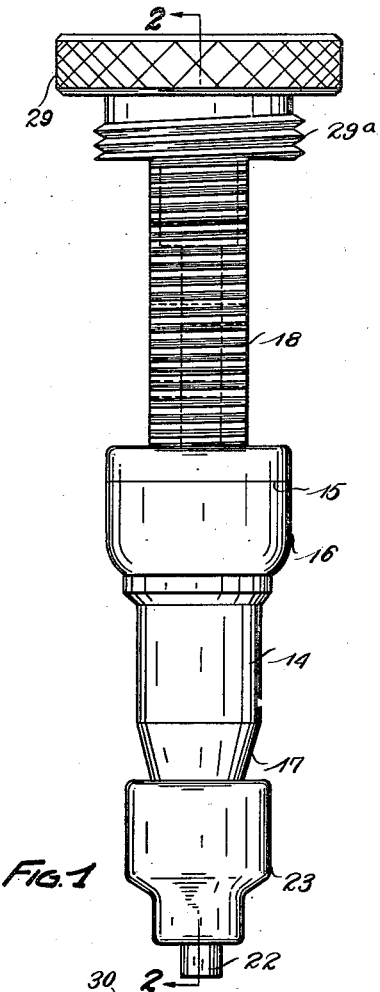
Fig. 1 is an elevation of the valve insides embodying the present invention.

Outwardly of the body portion there is a plug generally represented at 18. This plug is essentially rectangular in shape and its thickness is less than its width as is clearly to be observed from an inspection of Fig. 1. Certain of the outer surfaces of the member 18 are provided with screw threads which are adapted to cooperate with the threads upon the interior of the metal insert or valve stem 11 in which the core or valve insides is to be inserted. The plug 18 has a chamber portion 19 open at its opposite sides and a transverse bridge portion 20 that is provided with a central opening 20a, and beneath the bridge portion there is a lower chamber portion 21 also open at its opposite sides.

The plug member 18 has no mechanical connection with the body portion 14 but cooperates with it, when the valve insides is inserted or removed from a valve stem in a manner which will be subsequently described.

Upon that portion of the plug which is directly beneath the flange portion 29 later to be referred to, it is desirable to have a part preferably cylindrical and which is capable of having a few complete threads formed thereon such as indicated at 29a and the screw threads upon the flattened portion of the plug 18 will be a continuation of the thread 29a.

Extending longitudinally of the assembled body member 14 and plug 18 is a valve pin 22 which, at its lower end, has attached thereto a valve member 23 which is so formed as to carry a packing member 24, which is adapted to engage with the end 17 of the body member. Within the body member and surrounding the valve pin is a spring 25 which, at its lower end, seats upon a shoulder formed upon the interior of the body portion and at its other end engages with a stop member 22a that is formed upon the pin.

From the foregoing it will be clearly understood that the spring, by its expansive action, will hold the valve 23 against its seat 17.

The valve pin extends through the opening 20a in the bridge member 20 and, at its outer end, has a head or button portion 26 which has a rounded part 27 and a spud 28, which is so formed as to be attached to the end of the valve pin. This spud functions not only as a means of attachment for the valve pin but it also acts as a stop member limiting the inward movement of the head or button 26 which is accomplished when the spud 28 engages with the bridge 20. The head or button 26 is of a diameter to form an easy fit in the chambered portion 19 and extends essentially to the outer portion of the plug 18 and forms a closure for the open end which will prevent the entrance of dirt or other foreign material. In this respect, it functions in a manner similar to the well known type of valve cap. With the structure described there is no necessity for using a valve cap but the construction is such that a valve cap may be used if desired.

The outer end of the plug 18 is provided with a radially extending flange portion 29 which is so formed upon its peripheral portion that it may be engaged by the fingers of an operator for insertion into or removal from the end of a valve stem.

The outer portion or throat of the chamber 19 is provided with rather rounding walls 30 and additionally the rounded portion or part 27 extends well up in the vicinity of the rounding walls 30. This construction facilitates the reception of the usual air chuck which is customarily applied to the end of a valve stem when inflation is to be performed. The rounded portion 27 extends sufficiently high to be engaged by that portion of the air chuck which is intended to depress the valve pin of a valve insides. At the same time, the combination of the rounded walls 30 in connection with the portion 27, which is rounded or equivalently formed, relieves against the possibility of any slight peening action of the air chuck upon the outer end of the valve insides, setting up a burr which might interfere with the movement of the head or button 26. It will be noted that although there is no physical connection between the body portion 14 and the plug 18, such as a swivel connection as is sometimes used, nevertheless, when the body portion and the plug are assembled as shown in the drawing, with the valve pin extending through the opening 20a in the bridge 20 and the head or button 26 is screwed at the end of the valve pin, it brings about the result that the body portion cannot be separated from the plug portion, so that they may be handled as a unit.

When the core or valve insides is inserted in a stem, the threaded portion upon the plug engages with the threaded interior surface of the stem and continued turning causes the valve insides to move inwardly of the stem. The plug 18, since it has no mechanical connection with the body member 14, may turn relative thereto. Therefore, when the packing or gasket member 16 engages with the shoulder 13, the continued rotation of the plug pushes the gasket into firm frictional contact with the shoulder, thus providing an air seal and also assisting in holding the core or valve insides from becoming loose due to vibration or other causes.

In Fig. 4 there is disclosed a modified construction which is in all essential respects the same as that which has been described in connection with the preceding figures of the drawing, the exception being that the spring 31 is located in the chamber 19 of the plug 18 rather than in the chamber of the body member 14.

The spring 31, at its lower end, bears upon the upper portion of the bridge 20 and also bears upon the under portion of the head or button 26. It will be seen that by the construction which has just been described the spring 31 functions, so far as normally maintaining the valve 24 against its seat 17 and normally maintaining the head or button 26 adjacent the open end of the plug 18 are concerned, in precisely the same manner as the spring 25.

It will be appreciated that air supplied to a pneumatic device through a valve stem, in which a valve insides or core is mounted, must pass through the valve insides or core and since, by practice and adoption, a valve insides or core is rather small, the presence of the valve insides or core in a valve stem offers resistance to the passage of air therethrough and inasmuch as a valve insides or core requires operating parts, it becomes essential to so form the cooperating parts of the valve insides or core that there will be provided air passages of as large size as possible so as to restrict the passage of air through the valve insides to as small a degree as possible.

In the valve insides which has been herein described, the plug 18 fashioned as it is to have a lesser thickness than width results in providing a much greater space for the passage of air than could be accomplished by other structures. In other words, because of the use of a rather flat plug the air space within the valve stem in the vicinity normally occupied by the plug is materially increased over the air space in other structures where the form of the plug employs more metal and air can pass readily through the open sided chambers 19 and 20 and around the plug. This feature makes for rapid inflation and, while the matter of rapid inflation may not be of primary importance so far as the individual, who may use the same, is concerned, yet, on the assembly lines in tire manufacturing plants where inner tubes are tested, the rapid inflation and rapid deflation becomes a matter of great importance.

The maximum of high rate of inflation is obtained by a structure such as shown in Fig. 4 of the drawing, in which the spring is housed in the relatively large chamber 19 in the plug 18. In other words, omitting the spring from the body member 21 and placing an equivalent spring in the chamber 19 of the plug provides possibilities for greater rate of passage of air through the valve insides than is the case with the construction shown in Fig. 2.

From the foregoing description it will be seen that I have provided a valve insides or core which relieves against the present requirement for the use of a valve cap or the necessity of using tools for the insertion or removal of a valve insides and, at the same time, provides a valve insides or core which is so fashioned as to expedite the passage of air through the same when an inflating operation is performed. It will be appreciated that various changes may be made in the structure which is herein shown and described without departing from the spirit of the invention.

Having thus described my invention, I claim:

1. A core or valve insides comprising a plug having an outer flanged portion and a portion provided with threads and relatively narrow in thickness as compared with its width, there being an axial opening through said plug, a portion of said opening being restricted, a body portion having a longitudinal opening therethrough, said body portion at one end being adapted to engage with one end of the plug but being unattached thereto, the opposite end of said body portion being provided with a valve seat, a valve pin, a valve attached to said pin and cooperating with the said valve seat, said valve pin extending through the said openings in the body and plug, a button or head attached to one end of the pin and positioned beyond the restricted opening in the said plug whereby the plug and body portion are interconnected by said pin, and spring means normally holding the valve to its seat and the button or head in position to provide a closure for the outer portion of the opening in the plug.

2. A core or valve insides comprising a plug having an outer flanged portion and a portion provided with threads and relatively narrow in thickness as compared with its width, there being an axial opening through said plug which in one part is restricted and forms a ledge, a body portion having a longitudinal opening therethrough and adapted at one end to cooperate with the end of the plug but unattached thereto, the opposite end of the body portion being provided with a valve seat, a valve pin, a valve attached to said pin and cooperating with the said valve seat, said valve pin extending through the said openings in the body and plug, a button or head at an end of the pin and beyond said ledge, and a spring means engaging with the ledge in the axial opening of the plug and with thhe underside of the head or button thereby normally holding the valve to its seat and the button or head in position to provide a closure for the outer portion of the opening in the plug.

3. A core or valve insides comprising a plug having an outer flanged portion and a portion provided with threads relatively narrow in thickness as compared with its width, there being an axial opening through said plug and having a restricted portion and an enlarged portion, a body portion having a longitudinal opening therethrough, one end of the body portion being adapted to cooperate with an end of the plug but unattached thereto, said body portion being provided at its opposite end with a valve seat, a valve pin, a valve attached to said pin and cooperating with the said valve seat, said valve pin extending through the said openings in the body and plug, a button or head at the outer end of the pin outwardly of the restricted portion of said axial opening, and a spring means located within the body portion and serving to normally hold the valve to its seat and to maintain the button or head in the outer portion of the opening in the plug to provide a closure therefor.

4. A core or valve insides comprising a plug having an outer flanged portion and a portion provided with threads and relatively narrow in thickness as compared with its width, said plug having an axial opening therethrough in the form of a restricted portion and an enlarged portion, said enlarged portion of said opening being open at the opposite sides of said relatively narrow portion of said plug, a body portion having a longitudinal opening therethrough, one end of the body portion being adapted to cooperate with an end of the plug but unattached thereto, said body portion being provided at its opposite end with a valve seat, a valve pin, a valve attached to said pin and cooperating with the said valve seat, said valve pin extending through the said openings in the body and plug, a button or head at the outer end of the pin outwardly of the restricted portion of said axial opening, and spring means located within the body portion and serving to normally hold the valve to its seat and to maintain the button or head in the outer portion of the opening in the plug to provide a closure therefor.

5. A core or valve insides comprising a plug having an outer flanged portion and a portion provided with threads and relatively narrow in thickness as compared with its width, said plug having an axial opening extending therethrough and including separated enlarged portions which are open at the opposite sides of said plug and a restricted portion intermediate said enlarged portions, a body portion having a longitudinal opening therethrough, one end of the body portion being adapted to cooperate with an end of the plug but unattached thereto, said body portion being provided at its opposite end with a valve seat, a valve pin, a valve attached to said pin and cooperating with said valve seat, said valve pin extending through the said openings in the body and plug, a button or head at the outer end of the pin and outwardly of the restricted portion of said axial opening, and a spring means located within the body portion and serving to normally hold the valve to its seat and to maintain the button or head in the outer portion of the axial opening in the plug to provide a closure therefor.

6. A core or valve insides comprising a plug having an outer flanged portion, a cylindrical portion adjacent to said flanged portion and a substantially rectangular portion having threads upon oppositely disposed surfaces thereof and extending from said cylindrical portion; said plug having a central opening therethrough including a restricted portion and an enlarged portion, a body portion having a longitudinal opening therethrough, one end of the body portion being adapted to cooperate with an end of the plug but unattached thereto, said body portion being provided at its opposite end with a valve seat, a valve pin, a valve attached to said pin and cooperating with the said valve seat, said valve pin extending through the said openings in the body and plug, a button or head at the outer end of the pin outwardly of the restricted portion of said axial opening, and a spring means located within the body portion and serving to normally hold the valve to its seat and to maintain the button or head in the outer portion of the opening in the plug to provide a closure therefor.

7. A core or valve insides comprising a plug having an outer flanged portion, a cylindrical portion adjacent said flanged portion, and a flat substantially rectangular elongated portion extending from said cylindrical portion and having threads upon oppositely disposed surfaces thereof; said plug having a central opening therethrough formed of spaced enlarged portions open at the flat sides of said rectangular portion of said plug and with a restricted portion intermediate said enlarged portions, a body portion having a longitudinal opening therethrough and provided with a valve seat at one end thereof and adapted to engage at its other end with one end of said plug but being unattached thereto, a valve attached to said pin and cooperating with the said valve seat, said valve pin extending through the said openings in the body and plug, a button or head attached to the outer end of the valve pin in the outermost of said enlarged portions of the axial opening in said plug and beyond said restricted portion thereof whereby the plug and body portion are interconnected by said pin, and spring means normally holding the valve to its seat and the button or head in position to provide a closure for the outer portion of the opening in the plug.

8. A core or valve insides comprising a plug having an outwardly flanged outer end portion and an elongated externally threaded portion inwardly of said flanged portion, said plug having an axial opening therethrough with the outer part of said opening of larger diameter than the part of the opening inwardly thereof, wherefore a shoulder is provided internally of said plug, a body portion having a longitudinal opening therethrough, said body portion at one end being adapted to engage with one end of the plug but being unattached thereto, the opposite end of said body portion being provided with a valve seat, a valve pin extending through the said openings in the body and plug, a valve attached to said pin and cooperating with the said valve seat, a button or head attached to the outer end of the pin and positioned beyond the internal shoulder in said plug whereby the plug and body are interconnected by said pin, and spring means normally holding the valve to its seat and the button or head in position to provide a closure for the outer end of the opening in the plug.

ADELBERT E. BRONSON.